United States Patent [19]
Cipolla et al.

[11] Patent Number: 6,020,952
[45] Date of Patent: Feb. 1, 2000

[54] SYSTEM AND METHOD FOR PROVIDING ERROR-FREE OPTICAL SCANNING OF IMAGES ON FILM

[75] Inventors: Thomas Mario Cipolla, Katonah, N.Y.; Janusz Stanislaw Wilczynski, Sanda Park, N.Mex.

[73] Assignee: International Business Machines Corporation, Armonk, N.Y.

[21] Appl. No.: 08/841,854

[22] Filed: May 5, 1997

[51] Int. Cl.[7] .............................. G03B 27/64; H04N 1/04
[52] U.S. Cl. .......................... 355/76; 358/487; 358/506; 352/222
[58] Field of Search .................................. 355/75, 76, 18; 358/487, 506; 348/96; 352/222; 353/95

[56] References Cited

U.S. PATENT DOCUMENTS

| | | | |
|---|---|---|---|
| 3,081,682 | 3/1963 | Khoury | 355/76 |
| 3,103,850 | 9/1963 | Khoury et al. | 355/76 |
| 4,226,526 | 10/1980 | Spence-Bate et al. | 355/76 |
| 4,411,503 | 10/1983 | Bailey et al. | 352/222 |
| 5,111,241 | 5/1992 | Kralles | 355/75 |
| 5,400,152 | 3/1995 | Manico et al. | 358/506 |
| 5,404,195 | 4/1995 | Nagel | 355/76 |
| 5,420,700 | 5/1995 | Maeda et al. | 358/487 |
| 5,461,492 | 10/1995 | Jones | 358/487 |

FOREIGN PATENT DOCUMENTS 6406851  12/1965  Netherlands .

*Primary Examiner*—Alan A. Mathews
*Attorney, Agent, or Firm*—Anne Vachon Dougherty; Daniel P. Morris

[57] ABSTRACT

An inventive system and method for continually advancing film through an air-bearing film flattening system having at least one scanning area through which the air-flattened film may be scanned. The film is provided to an air-bearing mechanism comprising two opposing air-bearing plates which create opposing air cushions for maintaining the planarity of the film. The scanning area may comprise at least one optical aperture in the air-bearing plate or plates through which the scanner views the film, or a "viewing" area occupied by bundled coherent optical fibers which sequentially pick up image information from aligned regions of the image. The system provides for time efficient, clean, and error-free reading of the scanned image.

24 Claims, 5 Drawing Sheets

SYSTEM AND METHOD FOR PROVIDING ERROR-FREE OPTICAL SCANNING OF IMAGES ON FILM

FIELD OF THE INVENTION

This invention relates to optical scanning of imaged film. More particularly, it relates to a means for optimizing the scanning process for digitization of images film for signal processing and/or transmission, thereby providing continual, error-free scanning of the film images.

BACKGROUND OF THE INVENTION

To digitize a film for signal processing, transmission, or storage, the film is advanced frame by frame past an optical scanner. The thin film material must be kept flat within the depth of focus of the optical system in order to assure accurate pickup of the image on the film. The required flatness may be a few micrometers, which is particularly difficult when dealing with the thin, flexible films typically used for photographic imaging. For example, when mounted between two sprockets, 35 mm movie film tends to stretch into a cylindrical shape in the unsupported region between the holding sprockets. Therefore, it has become necessary to utilize additional means for flattening the film while it passes by the optical scanner.

One method for maintaining the planarity of film during scanning is to place the film material under a flat plate of transparent material, such as glass. A disadvantage to this method is that the transparent plate adds another optical element between the film and the scanning system, which can introduce errors in addition to interfering with the illumination during scanning.

An alternative film flattening technique has been to pass the film material through a frame which contacts the periphery of the film image area and has an open window through which the film image can be scanned. While the open window area avoids the problems of lighting alteration and of introducing artifacts to the scanned film image, optimal film flatness cannot be realized with only peripheral film contact. Both of the foregoing solutions require that additional time be spent in advancing the film and aligning the film image to the plate or window between scans. In addition, the prior art solutions both introduce new sources of error since physical elements of the system are contacting the film as it advances, which could lead to scratching or tearing of the film material.

It is therefore an objective of the present invention to provide a method and system for optimizing film flatness during scanning.

It is another objective of the invention to provide a system and method for achieving optimal film flatness without introducing additional optical elements as possible sources of error to the scanning system.

Yet another objective of the invention is to provide a system which allows scanning of film to be conducted continually, without the need to regularly stop the scanning process in order to advance and align the film.

Still another objective of the invention is to provide a system and method for film scanning which does not damage the film during the scanning process.

SUMMARY OF THE INVENTION

These and other objectives are realized by the present inventive system and method for continually advancing film through an air-bearing film flattening system having at least one scanning area through which the air-flattened film may be scanned. The film is provided to an air-bearing mechanism comprising at least two opposing air-bearing plates which create opposing air cushions for maintaining the planarity of the film. The scanning area may include at least one optical aperture, in at least one of the air-bearing plates, through which the scanner views the film, or a "viewing" area occupied by bundled coherent optical fibers which sequentially pick up image information from aligned regions of the image. The system provides for time efficient, clean, and error-free reading of the scanned image.

BRIEF DESCRIPTION OF THE DRAWINGS

The invention will now be described in greater detail with specific reference to the drawings wherein.

DESCRIPTION OF THE PREFERRED EMBODIMENT

The present invention is implemented within an optical scanning system, such as had been found in the prior art, including a light source for providing transmitted or reflected light onto a section of film, and from the film to an array of optical sensors. The ensuing description should be read to include other non-contact scanning systems, such as inspection equipment, hash mark locating and/or marking systems, etc., which would also require scanning of perfectly planar flexible film materials. In the prior optical scanning art, area arrays were generally required to receive the image from a stationary window of the film, which window was either viewed through a transparent flattening plate or through a peripherally-framed flattening and viewing area, as discussed above. After the area array had collected the image information from a stationary section of the film, the film was advanced and re-aligned to the flattening mechanism prior to activating the array for scanning of the next image. Use of the present invention will allow the film to be advanced continually, thereby allowing a single or multiple linear array to scan continually as the film advances.

Figure 1:
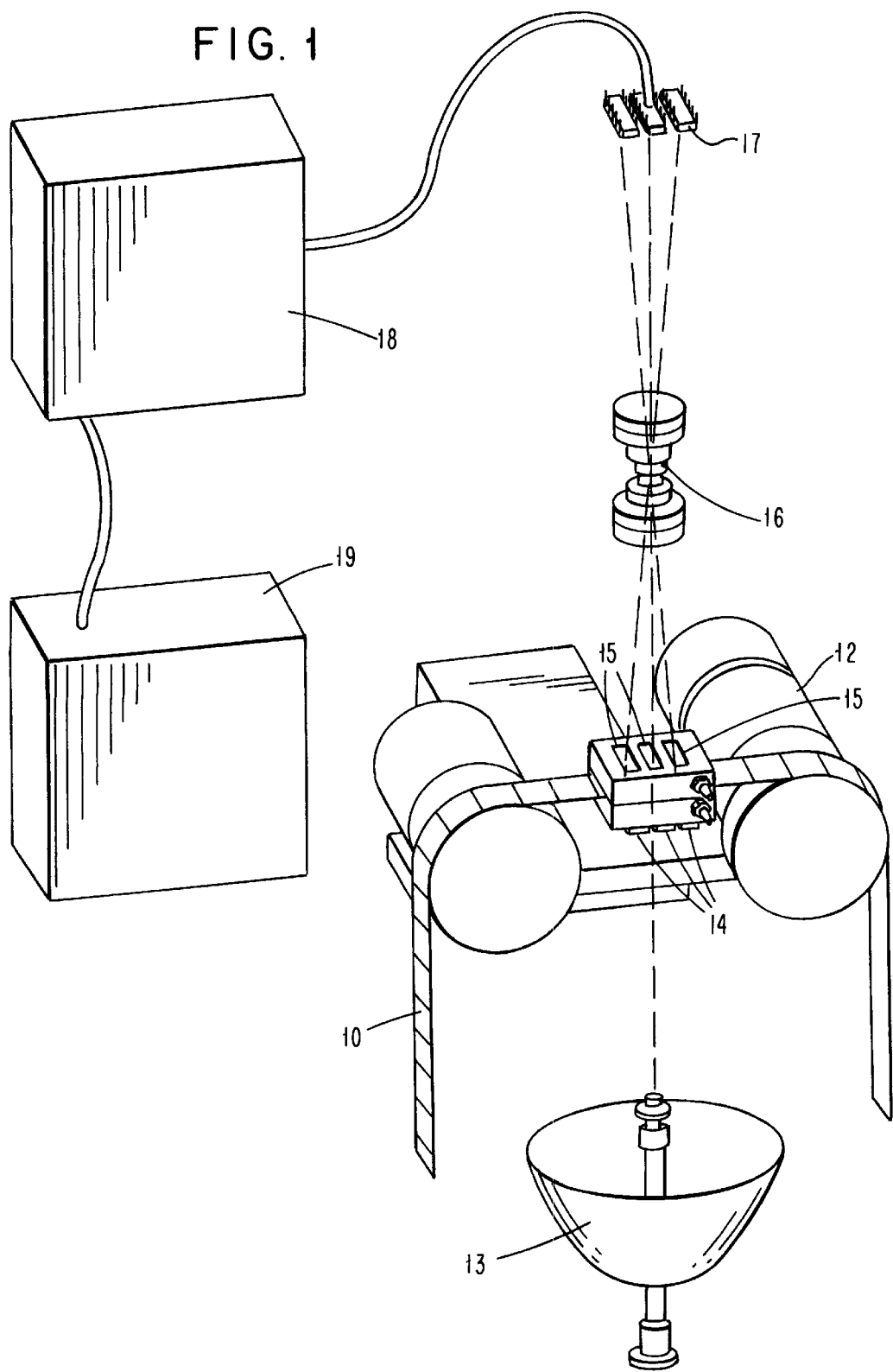
FIG. 1 illustrates an embodiment of the present air-bearing film conveyer system incorporated into a scanner which uses light transmitted through the air-flattened film, via three color filtered apertures to three linear scanning arrays, thereby allowing three color scanning of the imaged film.

FIG. 1 provides an illustration of one embodiment of the present invention wherein film 10 mounted on sprockets 12 advances through air-bearing mechanism 11. A light source 13 is directed to apertures (not shown) on the lower plate of the air-bearing mechanism, through film 10, out the apertures 15 of the upper plate, and onto linear array 17, via imaging lens 16. The film 10, which is physically being advanced by the movement of sprockets 12, is continually being provided to the air-bearing mechanism 11. The film advancement mechanism is shown as a tensioning system having sprocketed wheels on either side of the scanning area. While it may be possible to exert the requisite tension on the film by a single-stage film advancement system, or via a non-sprocketed tensioning system, the two-stage system is illustratively used.

In the air-bearing mechanism, the film is effectively flattened by exposure to opposing air currents issuing forth from the top and bottom plates of the air-bearing mechanism. There may be a plurality of plates located above and below the film; however, for generation of uniform opposing air cushions, single coextensive plates above and below the film are preferable. Apertures 15 are slits provided to allow light to pass through the film and onto the linear array of the optical scanner, as further discussed below.

The illustrated embodiment of FIG. 1 may be used to conduct a three-color (RGB) scan of the film image, whereby three apertures are provided at both the top and the bottom of the air-bearing mechanism. The apertures at the bottom of the film advancement mechanism are covered with color filters, 14, one each for red, green and blue light, so that the linear array is receiving specialized color information of the image through each aperture. Alternatively, a set of complementary filters, such as yellow, cyan and magenta, can be used.

The film advances at what is ideally a fixed rate past the apertures in the air-bearing mechanism, thereby allowing continuous scanning at the apertures by the linear array of the optical system. Due to the fact that the overall scanning speed is dependent upon the amount of light needed for a particular scanning application, film tracking electronics 19 communicates with the linear array electronics 18 to synchronize the rate of advancement of the film with the scanning speed. In general, use of a more intense light source will facilitate faster scanning speed; however, a light source may be too intense for scanning film with images having high brightness levels. Therefore, for optical scanning for film image transfer, the light source and the scanning speed must be chosen to maximize both efficiency and accurate image transfer.

Figure 2:
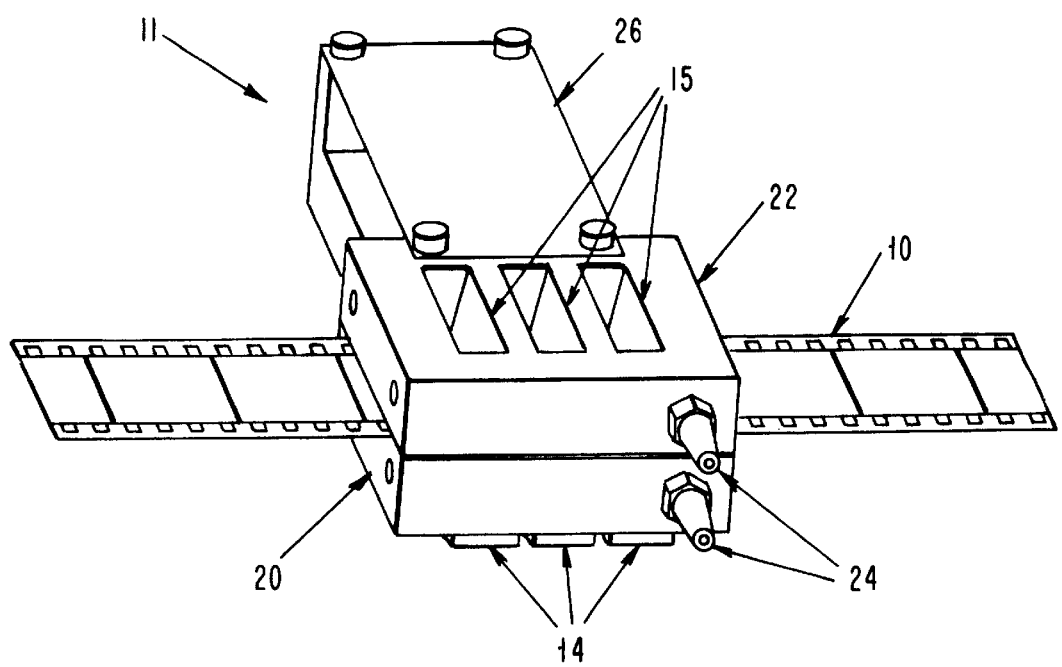
FIG. 2 provides a more detailed view of the air-bearing film conveyer of the present invention.

FIG. 2 provides a more detailed illustration of the air-bearing mechanism 11. The air-bearing mechanism is comprised of air-bearing plates, lower air-bearing plate 20 and upper air-bearing plate 22. As discussed briefly above, elements 20 and 22 may each be comprised of more than one plate, if desired. For the embodiment illustrated in FIG. 1, each air-bearing plate has at least one viewing aperture, 15, although viewing apertures per se may not be required for some scanning systems. For the FIG. 1 embodiment, the apertures on the bottom air-bearing plate are additionally fitted with optical filters, a feature which will be included for use with only some optical scanning systems.

The lower air-bearing plate apertures are provided for allowing light to pass through the apertures, through the film, and through the apertures in the upper air-bearing plate, which apertures are preferably aligned to the lower air-bearing plate apertures. The apertures in the upper air-bearing plate provide viewing or scanning access to the film by the optical array. Since linear arrays can be utilized, and their pixels are generally on the order of 10–15 micrometers, the aperture width may be made relatively small so that their presence in the plates will not compromise the air cushion to any appreciable extent. Assuming usage of 1:1 magnification, aperture width of slightly larger than the 10–15 micrometer pixel size is workable. In practice, the apertures may be tapered, so that the opening is larger on the outside of the plate where a larger area may be required to accommodate the angle of the incident light, and the opening at the inner, air-bearing surface narrower to minimize the amount of air escaping through the aperture.

Both the upper and the lower air-bearing plates of the air-bearing mechanism have a port 24 for connection to an air supply. It is not necessary to use purified air or any specific "ambient," unless such could affect either the film material or the scanning equipment. Filtering of the air supply is preferable in order to avoid clogging the small orifices found on most air-bearing surfaces and to reduce the possibility of air-borne particulates damaging the film or being mistakenly detected as part of the scanned image. The pressure of the air supply is not critical to the present invention, assuming that uniform, balanced upper and lower cushions are provided to hold the film planar. Commercially available air-bearing systems, of the sort used to transport solid items (e.g., semiconductor wafers) on a single air cushion, generally provide pressure in the 50–100 psi range, which range would be more than adequate for the present invention.

Figure 3:
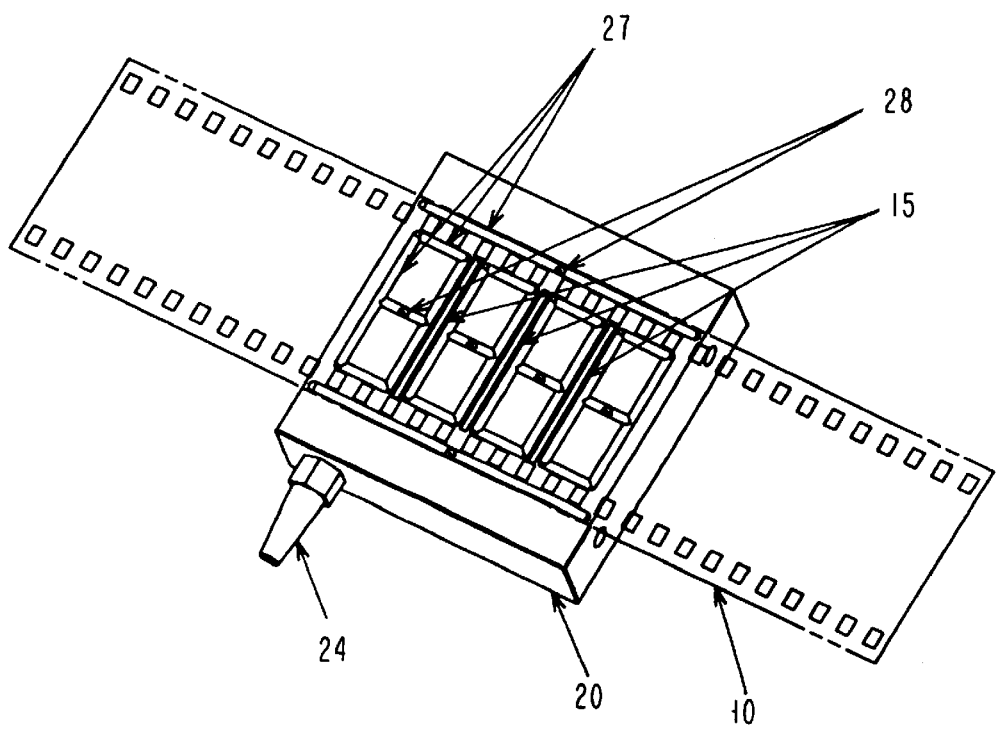
FIG. 3 schematically illustrates the internal view of one of the air-bearing surfaces of an embodiment of the present invention.

Within each of the upper and lower plates, as further illustrated in FIG. 3, are located air passages for creating the upper and lower cushions of air to which the advancing film is exposed and by which it is held flat during scanning. The air passages can comprise grooves formed in the inner surfaces of the plates, as shown in FIG. 3, or air channels having porous walls along the inner surfaces of the plates. The air passages, 27, are provided on the plates in all areas except for the areas at which the film sprocket holes are located. While uniform distribution of the air passages will facilitate predictability and control of the air flow and of the resulting air pressure for flattening the film material, it is not necessary that the air passages be uniformly positioned; nor is it necessary that the upper and lower plates have mirror image air passages.

What is necessary is that each plate include means for regulating the air flow, such as the orifices associated with the air grooves at 28 of FIG. 3, the details of which are well known in commercially available air-bearing systems. For the inventive air-bearing system, where the load on the air cushion is small and does not undergo appreciable change during usage, small orifices (on the order of 15–20 micrometers in diameter) are optimal. The use of smaller orifices will result in a stiffer bearing (i.e., one having small changes in the air gap based upon variations in the vertical load), a smaller nominal air gap thickness (e.g., less than 10 micrometers), and minimal air consumption.

Film flatness will be realized by establishment of a uniform cushion of air at each surface of the film. One of the upper and the lower air-bearing plates should be movably mounted to allow for movement in the Z-direction, perpendicular to the film plane, and thereby provide the flexible air gap necessary to "float" the film along the mechanism. Preferably, for ease of design, the upper plate is the one which is movably mounted. Flexure 26, as the illustrated moveable mounting for the upper plate of the air-bearing mechanism in FIG. 2, allows Z-direction movement of the upper plate, but is immovable in the X and Y directions. A uniform downward force is required to maintain pressure of the film and hence maintain film flatness. A number of means can be used to provide the constant downward pressure. FIG. 2 shows the force being provided by a preload on the flexure spring. Other ways in which the force can be exerted include gravity, whereby a weight is added to the air-bearing plate, or a compression spring acting on the upper air-bearing plate.

Those having skill in the art will recognize that the air film gap is controlled by the magnitude of the downward force and the size of the orifices that control the air flow. Since the invention uses air bearing in an unconventional way, i.e., to flatten a film between two air cushions rather than to move a heavy object along a single air cushion, the load on the air bearings is considerably smaller than in typical air-bearing applications. As a practical matter, one should use the smallest orifices possible and then add the minimum vertical force sufficient to stabilize the air-bearing plates. It is contemplated that the use of air channels having porous surfaces will optimize air flow regulation with the minimum need for a compensating load.

The position being scanned on the film is sensed by an encoder or like device incorporated into the drive motor. Since a direct measurement at the point of scan cannot be made, any unknown length variations between the point of scan and the encoder will cause errors in the sensed position of the scan line of the film. One such source of error lies with the sprocket holes on the film. If the sprocket holes are not perfectly uniformly spaced, a position error will occur, and propagate. To minimize the effects of such an error source, a large sprocket wheel having many sprocket teeth is utilized so that hole-to-hole variation is effectively averaged over many holes to minimize position errors.

It is to be noted that the inventive air-bearing flattening system provides a virtually frictionless film advancement system (apart from the sprocket-to-perforation contact which is carried on outside of the air-bearing mechanism). This low friction environment will minimize any contact with the film image surface, thereby preventing film damage during scanning. In addition, the air-bearing mechanism may actually improve image transfer during optical scanning because the flowing air can actually remove any accumulated debris from the film image surfaces.

Figure 4:
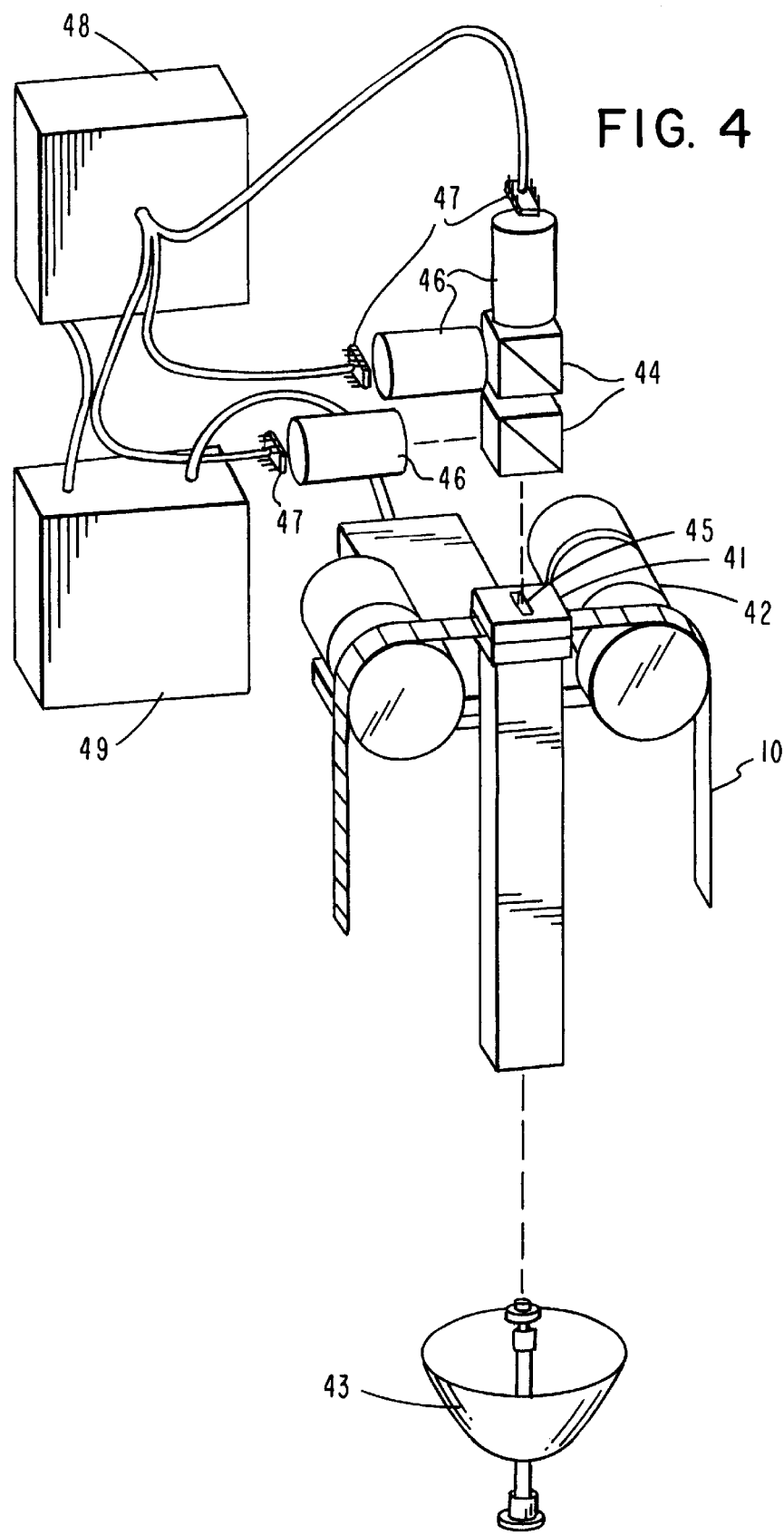
FIG. 4 depicts a single aperture embodiment of the air-flattening scanner system wherein the single scanning line is separated into three colors.
Figure 5:
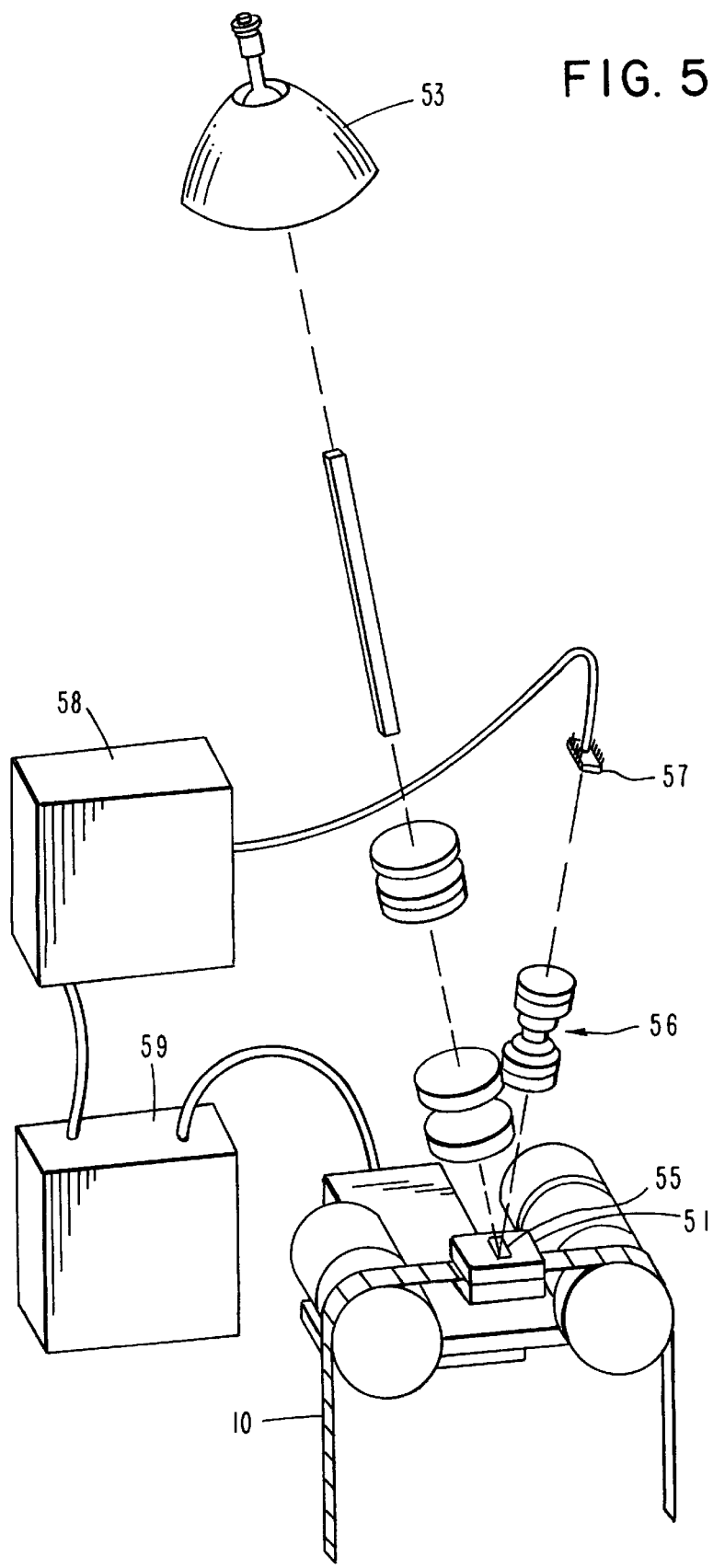
FIG. 5 illustrates another embodiment of the invention wherein reflected light is provided to the air-flattened film.
Figure 6:
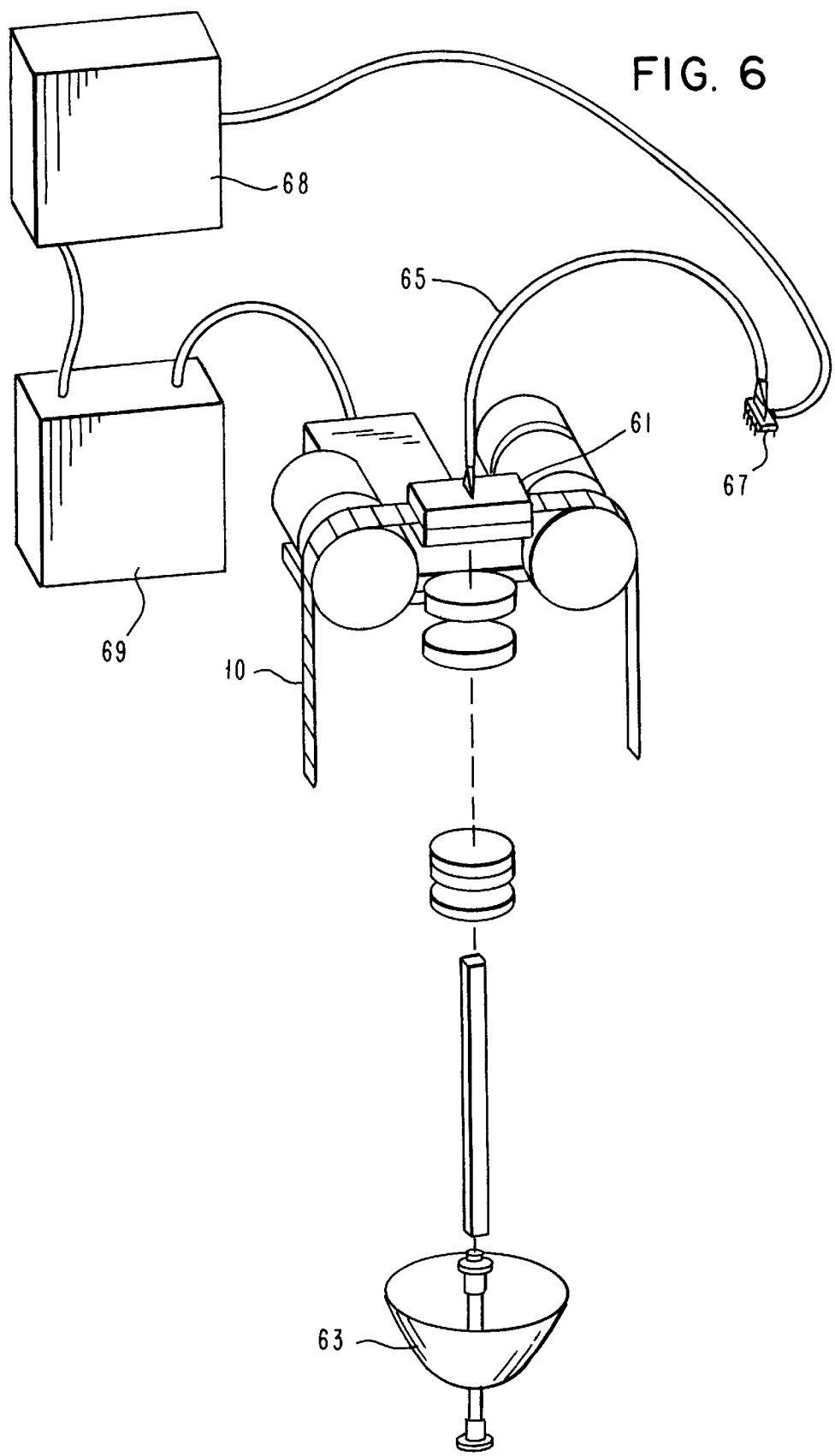
FIG. 6 shows an embodiment of the present invention wherein bundled optical fibers pick up the image via light transmitted through the air-flattened film.

FIGS. 4 through 6 provide alternative optical scanning systems which incorporate the inventive air-bearing mechanism. The system shown in FIG. 4 provides an alternative way of obtaining a three color scan of the film images which also does not require repeated scanning of the film. Light source 43 is provided to one aperture (not shown) at the outer surface of the lower plate of air-bearing mechanism 41. As film is advanced by the sprocketing system 42 and through the air-bearing mechanism 41, it passes by aperture 45 in the upper plate of the air-bearing mechanism, which is aligned to the lower plate aperture. White light passing through the lower aperture, film, and upper aperture is directed by beam splitters or mirrors 44 via imaging lenses 46 to each of three different linear arrays, 47, one each for a red, a blue and a green sensor. As an alternative, a single lens may be employed between the light-splitting elements and the film, as is common in three color cameras utilizing charge coupled devices or CCDs. The electronics, 48, for providing input to and receiving input from the linear arrays will additionally be in communication with the film advancement electronics 49, as noted above with reference to the corresponding components in FIG. 1.

FIG. 5 illustrates an optical film scanning system which utilizes reflected rather than transmitted light for illumination of the film. Light from source 53 is provided at an angle of incidence through upper plate aperture 55 to film 10 in the air-bearing mechanism, 51. The lower plate of the air-bearing mechanism will not be outfitted with an aperture for the FIG. 5 embodiment. Light reflected off of the film 10 will be provided via lens system 56 to linear array 57. As above, electronics 58 and 59 will coordinate the linear array scanning rate with the film advancement rate to assure continual accurate scanning of the images. The above-mentioned three color scanning schemes, utilizing beam splitters and multiple CCDs is also applicable here.

Finally, FIG. 6 illustrates an optical scanning system which incorporates bundled coherent optical fibers, 65, for providing light to the linear array, 67. Light from source 63, provided to the film 10 in the air-bearing mechanism 61 by an aperture (not shown) in the lower plate, is received by one or more of the optical fibers in bundle 65 and is transmitted to the linear array or arrays by the fibers. Optical array control electronics 68 coordinates the film advancement with electronics 69, as above.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. Apparatus for providing a planar film surface to a scanning area for scanning of said film comprising:

film advancement means for advancing said film to said scanning area; and air-bearing film planarizing means in said scanning area, said air-bearing film planarizing means comprising at least one first air-bearing plate for continually providing a uniform air cushion at the top surface of the film and at least one second air-bearing plate for continually providing an equal uniform air cushion at the bottom surface of the film.

2. The apparatus of claim 1, wherein said first and said second air-bearing plates further comprise means to regulate air flow through said plates.

3. The apparatus of claim 1, wherein said at least one first air-bearing plate additionally comprises at least one aperture through which said film is scanned.

4. The apparatus of claim 3, wherein said at least one second air-bearing plate additionally comprises at least one aperture through which light is transmitted to said film.

5. The of claim 1 for providing a planar film surface for scanning wherein said film advancement means comprises at least a first stage for providing film for scanning and a second stage for advancing film after scanning; and wherein said air-bearing film planarizing means is positioned between said first and said second stages of said film advancement means.

6. The apparatus of claim 1 further comprising at least one light source for illuminating said film and at least one optical sensor for sensing light received from illuminated film in said scanning area.

7. The apparatus of claim 6 additionally comprising coherent optical fiber means for providing the image from said film to at least one optical sensor.

8. The apparatus of claim 6 wherein said at least one light source comprises means for reflecting light of said film.

9. A system for optical scanning of images on film comprising:

optical scanning means for scanning film in a scanning area;

film advancement means for providing film to said scanning area; and air-bearing film planarizing means in said scanning area, said air-bearing film planarizing means comprising at least one first air-bearing plate for continually providing a uniform air cushion at the top surface of the film and at least one second air-bearing plate for continually providing an equal uniform air cushion at the bottom surface of the film.

10. The system of claim 9 wherein said optical scanning means comprises at least one light source for illuminating said film; and, at least one optical sensor for scanning and detecting images on said film.

11. The system of claim 10 wherein said at least one optical sensor comprises a linear sensor array.

12. The system of claim 10 wherein said at least one light source comprises means for transmitting light through said film.

13. The system of claim 9 further comprising means to synchronize said optical scanning means and said film advancement means.

14. The system of claim 9, wherein said first and said second air-bearing plates further comprise means to regulate air flow through said plates.

15. The system of claim 9, wherein said at least one first air-bearing plate additionally comprises at least one aperture through which said film is scanned.

16. The system of claim 15, wherein said at least one second air-bearing plate additionally comprises at least one aperture through which light is transmitted to said film.

17. A system for optical scanning of images on film comprising:

optical scanning means for scanning film in a scanning area comprising at lest one light source for illuminating said film and at least one optical sensor for scanning and detecting images on said film;

film advancement means for providing film to said scanning area;

air-bearing film planarizing means in said scanning area; and coherent optical fiber means for providing said image to said at least one optical sensor.

18. A system for optical scanning of images on film comprising:

optical scanning means for scanning film in a scanning area comprising at lest one light source for illuminating said film and at least one optical sensor for scanning and detecting images on said film;

film advancement means for providing film to said scanning area; and air-bearing film planarizing means in said scanning area, wherein said at least one light source comprises means for reflecting light off of said film.

19. A method for planarizing film for scanning at a scanning area comprising the steps of:

continually advancing film past the scanning area; and providing equal uniform and continuous air cushions at the top and the bottom surfaces of said film in said scanning area.

20. The method of claim 19 further comprising scanning said film in said scanning area.

21. The method of claim 20 wherein said scanning additionally comprising providing film image information to at least one optical sensor.

22. The method of claim 21 wherein said providing film image information to at least one optical sensor comprises transmitting said information along at least one optical fiber.

23. The method of claim 20 wherein said scanning comprises providing light to said scanning area.

24. The method of claim 23 wherein said providing light comprises reflecting light off of said film.

* * * * *